United States Patent Office 3,015,674
Patented Jan. 2, 1962

3,015,674
PROCESS FOR THE PRODUCTION OF ALKYLACYLAMIDES
Arthur W. Campbell, Terre Haute, Ind., assignor to Commercial Solvents Corporation, Terre Haute, Ind., a corporation of Maryland
No Drawing. Filed Mar. 10, 1958, Ser. No. 720,069
10 Claims. (Cl. 260—561)

My invention relates to a process for the production of lower alkylacylamides and more particularly, to a process for the production of lower alkylformamides and alkylacetamides prepared by reacting a lower alkylamine with formic and acetic acid respectively in the presence of an alumina catalyst.

The alkylacylamides formed by my process include dimethylformamide, diethylformamide, dipropylacetamide, dibutylacetamide, dipentylformamide, methylformamide, propylformamide, butylacetamide, hexylacetamide, etc. I have found that the catalysts used in the process of my invention are operative only when formic or acetic acids are used to acylate alkylamines.

Any catalyst containing activated alumina can be used in the process of my invention, though I prefer to use a catalyst such as the one manufactured by the Aluminum Company of America, and sold under the designation "E-10." This catalyst is substantially 100% pure activated alumina. Catalysts containing 87% silicon dioxide and 13% aluminum oxide such as Davison Chemical Company catalyst No. SMR-55-5138 also give excellent results in my process.

Although alumina is known to be a dehydration catalyst it appears to be unique in my new process as other dehydration catalysts such as copper beads, silica, boric acid on silica, carborundum, etc. show no evidence of catalysis when utilized in my process. I have also found that alumina catalysts are poisoned when the process is started up or shut down at low temperatures in the presence of an excess of amine. However, it is preferable, at operating temperatures, to carry out the process in the presence of a slight excess of alkylamine.

The process of my invention can be carried out at temperatures ranging from about 160 to about 375° C., though I prefer to carry out the process of my invention at temperatures ranging from about 190 to about 300° C.

I have found that the process of my invention is operative using molar ratios of reactants ranging from .08:1 to 1.5:1 alkylamine to formic or acetic acid. I prefer to carry out the process of my invention at a molar ratio in excess of about 1.05:1 as I have found that a slight excess of alkylamine in the reactor at reaction temperatures permits the utilization of relatively lower temperatures to consistently obtain yields in excess of 90%.

I have found that my process is operative at atmospheric pressure and that little or no added pressure is necessary to obtain excellent yields.

The following examples further illustrate my invention but it is not intended that the invention be limited to the exact portions, apparatus, or reactants set out therein, but rather it is intended that all equivalents obvious to those skilled in the art be included within the scope of my invention.

Example I

A reactor prepared from a Pyrex tube 1000 mm. in length and 22 mm. I.D. having a concentrically situated 8 mm. O.D. Pyrex thermowell running the length of the reactor was filled with 330 cm.³ of Alcoa catalyst E-10. This reactor was used to determine optimum reaction temperatures for the preparation of dimethylacetamide from dimethylamine and acetic acid. A reactant mixture ratio of 1.05:1 dimethylamine to acetic acid was used in all runs. The following table discloses the purity of dimethylacetamide recovered from the reactor prior to distillation to remove dimethylacetamide-acetic acid complex from the reaction mixture. The described temperatures were used in the individual runs.

| Temperature ° C.: | Product purity, percent |
|---|---|
| 149–152 | 74.04 |
| 160–168 | 81.05 |
| 190–192 | 91.38 |
| 210 | 97.68 |
| 230–232 | 99.48 |
| 250–252 | 98.91 |
| 275–279 | 98.33 |
| 296–305 | 96.55 |
| 326–328 | 94.86 |
| 345–352 | 93.44 |

Example II

In the reactor described in Example I, dimethylacetamide was prepared in a further series of runs carried out to determine the optimum temperatures wherein the reaction mixture ratio of dimethylamine to acetic acid was 0.95:1. The following table sets out the reaction temperatures and the purity of the dimethylacetamide recovered from the reactor.

| Temperature ° C.: | Product purity, percent |
|---|---|
| 185–188 | 78.39 |
| 220–230 | 90.42 |
| 250–252 | 99.38 |

Example III

In the reactor described in Example I a series of runs were carried out to determine optimum feed rates for the preparation of dimethylacetamide. The following table discloses the purity of dimethylacetamide obtained from a series of runs wherein the reactant mixture contained a ratio of dimethylamine to acetic acid of 1.05:1 and wherein the temperatures were maintained approximately constant.

| Temperatures, ° C. | Product Purity, Percent | Feed rate, ml./hr. |
|---|---|---|
| 228–233 | 99.59 | 31.3 |
| 227–234 | 99.10 | 32.8 |
| 228–235 | 99.40 | 33.3 |
| 227–234 | 99.32 | 41.7 |
| 230–231 | 93.11 | 46.3 |
| 226–233 | 90.113 | 47.0 |
| 232–234 | 87.79 | 50.0 |
| 229–234 | 90.43 | 80.0 |

Example IV

Into the reactor described in Example I, 100 mls. of acetic acid and 260 mls. of dibutylamine were introduced over a period of 2 hours and 40 minutes. The reactor was maintained at 232–235° C. during the reaction period. 171.5 gms. of dibutylacetamide, 99.35% based on acetic acid, was recovered and found to contain 0.43% acetic acid.

Example V

Into the reactor described in Example I, 100 mls. of an aqueous solution containing 88% formic acid and 342 grams of gaseous dimethylamine were introduced over a period of 2 hours and 30 minutes. The temperature was maintained at 229–233° during the reaction period. 163 gm. of dimethylformamide, representing a conversion of 90.3% acid, was recovered and found to contain 0.27% formic acid.

Example VI

Into a reactor similar to the one described in Example I containing 200 grams of Davison SMR-55-5138 139 ml. of acetic acid and 150 ml. of monomethylamine were introduced over a 6 hour period. The reaction products were distilled in 190–207° C. to obtain a high purity product.

Now having described my invention, what I claim is:

1. In a process for the production of lower alkylacylamides by contacting a lower alkylamine with an acid, the step which comprises contacting an alkylamine selected from the group consisting of lower monoalkylamines and lower dialkylamines with an acid selected from the group consisting of formic and acetic acids in an alkyl amine to acid molar ratio ranging from 0.8:1 to 1.5:1 in the presence of an activated alumina containing catalyst at temperatures ranging from about 160–375° C.

2. The process of claim 1 wherein the reaction temperature is 190–375° C.

3. The process of claim 1 wherein the alkylamine and acid are present at a molar ratio from about 1.05:1 to about 1.5:1 ranging from 0.8:1 to 1.5:1.

4. The process of claim 2 wherein the alkylamine and acid are present at a molar ratio from about 1.05:1 to about 1.5:1 rangingg from about 0.8:1 to about 1.5:1.

5. The process of claim 2 wherein the alkylamine is dimethylamine and the acid is formic acid.

6. The process of claim 2 wherein the alkylamine is dimethylamine and the acid is acetic acid.

7. The process of claim 2 wherein the alkylamine is monomethylamine and the acid is formic acid.

8. The process of claim 2 wherein the alkylamine is monomethylamine and the acid is acetic acid.

9. The process of claim 2 wherein the alkylamine is monoethylamine and the acid is formic acid.

10. The process of claim 2 wherein the alkylamine is monoethylamine and the acid is acetic acid.

References Cited in the file of this patent

UNITED STATES PATENTS

| 2,476,500 | Mahan | July 19, 1949 |
| 2,932,665 | Wagner | Apr. 12, 1960 |

FOREIGN PATENTS

| 719,792 | Great Britain | Dec. 8, 1954 |

OTHER REFERENCES

Mitchell et al.: J.A.C.S., vol. 53 (1931), pages 1879–83.

Ruhoff et al.: J.A.C.S., vol. 59 (1937), pages 401–2.